(12) United States Patent
Cap et al.

(10) Patent No.: US 12,457,093 B2
(45) Date of Patent: Oct. 28, 2025

(54) QSL—DATA AT REST

(71) Applicant: QuSecure, Inc, San Mateo, CA (US)

(72) Inventors: Christopher Cap, Bayville, NJ (US); Barry Van Hooser, Pleasanton, CA (US)

(73) Assignee: QuSecure, Inc, Petaluma, CA (US)

( * ) Notice: Subject to any disclaimer, the term of this patent is extended or adjusted under 35 U.S.C. 154(b) by 275 days.

(21) Appl. No.: 18/155,256

(22) Filed: Jan. 17, 2023

(65) Prior Publication Data
US 2023/0291545 A1 Sep. 14, 2023

Related U.S. Application Data

(60) Provisional application No. 63/319,322, filed on Mar. 13, 2022.

(51) Int. Cl.
*H04L 29/06* (2006.01)
*G06F 21/64* (2013.01)
*H04L 9/06* (2006.01)
*H04L 9/08* (2006.01)

(52) U.S. Cl.
CPC ............ *H04L 9/0631* (2013.01); *G06F 21/64* (2013.01); *H04L 9/083* (2013.01); *H04L 9/0852* (2013.01)

(58) Field of Classification Search
None
See application file for complete search history.

(56) References Cited

FOREIGN PATENT DOCUMENTS

WO    WO-2022182911 A1 * 9/2022 ........... H04L 9/0822

OTHER PUBLICATIONS

Authors: Gallagher et al., "Morpheus: A Vulnerability-Tolerant Secure Architecture Based on Ensembles of Moving Target Defenses with Church", Publisher: Association for Computing Machinery; ISBN: 978-1-4503-6240-5/19/04 Date: Apr. 13-17, 2019, pp. 469-484 (Year: 2019).*

* cited by examiner

*Primary Examiner* — Andrew J Steinle

(57) ABSTRACT

A method to allow a client to communicate with a server, specifically to conduct a key management service, in order to obtain encryption/decryption keys for data-at-rest, wherein the method comprises: causing the client to use Authenticated Encryption with Associated Data (AEAD) to encrypt data according to a moving target design and causing the client, at a later time, to use AEAD to check the integrity of the data and decrypt the data according to the moving target design.

10 Claims, 17 Drawing Sheets

---

The server uses AEAD to send the unique identifier (handle), the client's unique identifier (id), and the symmetric keys coupled with the number of bytes each key encrypts (num_1:session_1, num_2:session_2, ..., num_n:session_n) to the Key Management Dataset worker process for storage under the unique identifier (handle)
910

The server sends the unique identifier (handle) and the symmetric keys coupled with the number of bytes each key encrypts (num_1:session_1, num_2:session_2, ..., num_n:session_n) to the client using a Variable Length Buffer Handshake
912

122

| Unique Identifier | Password Hash | Address | Symmetric Key(s) |
|---|---|---|---|
| Unique Identifier | Password Hash | Address | Symmetric Key(s) |

• • •

| Unique Identifier | Password Hash | Address | Experimental KEM Secret Key | Symmetric Key(s) |
|---|---|---|---|---|

| Handle | Unique Identifier | Number of Bytes | Symmetric Key(s) | Number of Bytes | Symmetric Key(s) |
|---|---|---|---|---|---|
| Handle | Unique Identifier | Number of Bytes | Symmetric Key(s) | | |

• • •

| Handle | Unique Identifier | Number of Bytes | Symmetric Key(s) | Number of Bytes | Symmetric Key(s) |
|---|---|---|---|---|---|

```
┌─────────────────────────────────────────────────┐
│ The initiator encapsulates a symmetric key using│
│ the recipient's static KEM public key, producing│
│ ciphertext                                      │
│ 502                                             │
└─────────────────────────────────────────────────┘
                        ↓
┌─────────────────────────────────────────────────┐
│ The initiator generates an ephemeral KEM keypair│
│ 504                                             │
└─────────────────────────────────────────────────┘
                        ↓
┌─────────────────────────────────────────────────┐
│ The initiator uses AEAD with the symmetric key  │
│ to encrypt the ephemeral KEM public key,        │
│ producing encrypted text                        │
│ 506                                             │
└─────────────────────────────────────────────────┘
                        ↓
┌─────────────────────────────────────────────────┐
│ The initiator sends the ciphertext concatenated │
│ with the encrypted text to the recipient        │
│ 508                                             │
└─────────────────────────────────────────────────┘
                        ↓
┌─────────────────────────────────────────────────┐
│ The recipient decapsulates the ciphertext using │
│ the static KEM secret key, producing the        │
│ symmetric key                                   │
│ 510                                             │
└─────────────────────────────────────────────────┘
                        ↓
┌─────────────────────────────────────────────────┐
│ The recipient uses AEAD with the symmetric key  │
│ to decrypt the encrypted text, producing the    │
│ ephemeral KEM public key                        │
│ 512                                             │
└─────────────────────────────────────────────────┘
                        ↓
┌─────────────────────────────────────────────────┐
│ The recipient encapsulates a second symmetric   │
│ key using the ephemeral KEM public key,         │
│ producing a second ciphertext                   │
│ 514                                             │
└─────────────────────────────────────────────────┘
                        ↓
┌─────────────────────────────────────────────────┐
│ The recipient sends the second ciphertext to    │
│ the initiator                                   │
│ 516                                             │
└─────────────────────────────────────────────────┘
                        ↓
┌─────────────────────────────────────────────────┐
│ The initiator decapsulates the second ciphertext│
│ using the ephemeral secret key, producing the   │
│ second symmetric key                            │
│ 518                                             │
└─────────────────────────────────────────────────┘
```

| The Moving Target Design provides a method for injecting new key material into an existing session, as well as a method to switch between encryption keys. The keys and the number of bytes each key will encrypt is determined by the server and is transferred to the client using the Variable Length Buffer Handshake |
|---|
| 601 |

↓

| Initiator uses AEAD to send the number of bytes the plan to encrypt to the server |
|---|
| 602 |

↓

| Server randomly generates the number of keys to be used, each key, and the number of bytes each key will encrypt (up to a maximum number of keys) |
|---|
| 604 |

↓

| The server uses the variable length buffer handshake to send each key and the number of bytes each key will encrypt to the initiator |
|---|
| 606 |

↓

| If the initiator runs out of keys before all data is encrypted, the initiator restarts from the beginning |
|---|
| 608 |

| Client |
|---|
| 702 |

↓

| Data-at-Rest Key Management Server |
|---|
| 704 |

FIG. 7

The server uses AEAD to send the unique identifier (handle), the client's unique identifier (id), and the symmetric keys coupled with the number of bytes each key encrypts (num_1:session_1, num_2:session_2, ..., num_n:session_n) to the Key Management Dataset worker process for storage under the unique identifier (handle)
910

↓

The server sends the unique identifier (handle) and the symmetric keys coupled with the number of bytes each key encrypts (num_1:session_1, num_2:session_2, ..., num_n:session_n) to the client using a Variable Length Buffer Handshake
912

QSL—DATA AT REST

RELATED APPLICATIONS

The applicant claims the benefit under 35 USC 119(e) of U.S. Provisional Application No. 63/319,322 filed on Mar. 13, 2022, which is incorporated herein by reference in its entirety.

BACKGROUND

The present invention relates to data encryption, and more specifically, to provide post-quantum security for data-at-rest.

SUMMARY

According to embodiments of the present invention, a computer-implemented method includes: a method to allow a client to communicate with a server, specifically to conduct a key management service, in order to obtain encryption/decryption keys for data-at-rest, wherein the method comprises: causing the client to use Authenticated Encryption with Associated Data (AEAD) to encrypt data according to a moving target design and causing the client, at a later time, to use AEAD to check the integrity of the data and decrypt the data according to the moving target design.

According to another embodiment of the present invention, a system including at least one processor, at least one computer-readable memory and at least one computer-readable, tangible storage device; configured with at least one processor communicating with at least one outside processor using a key management service module; the key management service module provides encryption/decryption keys for data-at-rest, such that the key management service module provides identity-based access controls to unlock data, centralized cryptographic key and policy management, automatic key rotation, and logging of all events for future audits.

BRIEF DESCRIPTION OF THE OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1C is a block diagram of an example structure of a unique identifier dataset, in accordance with some implementations of the present invention.

FIG. 1D is a block diagram of an example structure of a key management service (KMS) dataset, in accordance with some implementations of the present invention.

FIG. 5 is a flow diagram of an example method providing forward secrecy via post-quantum Key Encapsulation Mechanism algorithms, in accordance with some implementations of the present invention.

FIG. 6 is a flow diagram of an example method for alternating between session keys following a Moving Target design, in accordance with some implementations of the present invention.

FIG. 7 is block diagram of an example of a system for allowing clients to communicate with a data-at-rest key management server, in accordance with some implementations of the present invention.

FIG. 9A-9C are flow diagrams of an example method for provide logged-in clients with high-entropy symmetric key-pairs for the encryption and decryption of data-at-rest, in accordance with some implementations of the present invention.

DETAILED DESCRIPTION

Figure 1A:
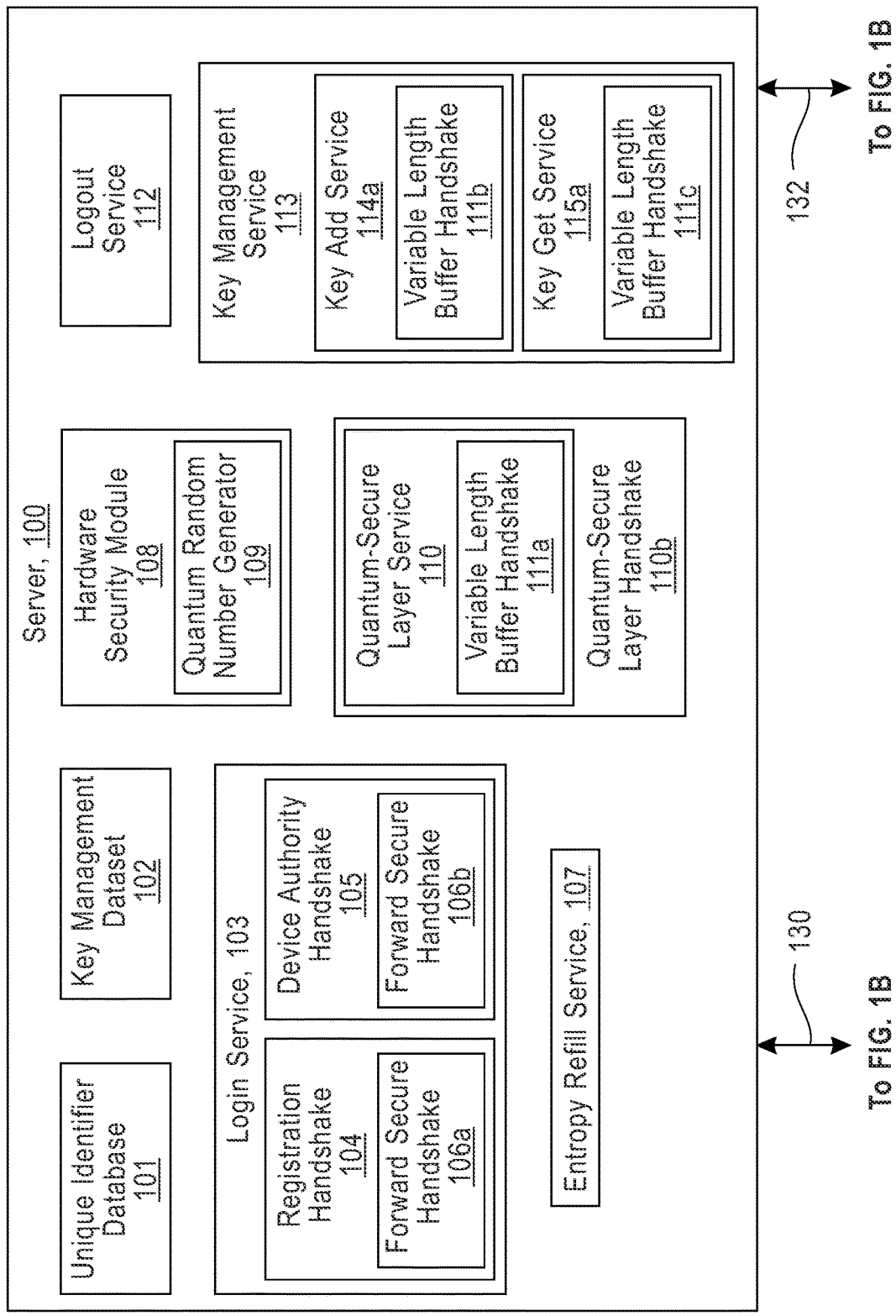
FIG. 1A is a block diagram of an example of a system for handshaking, without a certificate authority, to provide at least post-quantum communications security over a computer network, in accordance with some implementations of the present invention.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Aspects of the invention are not limited in their application to the details of construction and the arrangement of the components set forth in the following description or illustrated in the drawings. The embodiments of the invention described herein are applicable to other embodiments or are capable of being practiced or carried out in various ways. The phraseology and terminology employed herein are for the purpose of description and should not be regarded as limiting. As will be appreciated by one skilled in the art, aspects of the present invention can be embodied as a system, method or computer program product.

Many of the most notorious cybersecurity hacks have been the result of SNDL campaigns (steal now, decrypt later)

in which a bad actor will steal an encrypted data source and sit on it for several months or years until they are able to decrypt it. Once decrypted, the data is then distributed or sold on the dark web.

With the applicant's Data at Rest invention, you can define and enforce how data is protected, who may access specific data, and what format that data will take when access is granted, all packaged with hardened post-quantum cryptography. Most importantly, you can ensure your sensitive data is protected for as long as you need it to be.

Features of applicant's invention include but limited too:
Identity-based access controls to unlock data;
Leverages our centralized, cryptographic key and policy management;
Automatic key rotation;
Log of all events for audit;
Highly customizable for enhanced security and controls; and
Future resiliency for the upcoming FIPS 140-3 standards.

Provide logged-in clients with high-entropy symmetric keys for the encryption and decryption of data-at-rest. The Key Management Service consists of two sub-services: the Key Add Service and the Key Get Service. The Key Management Service relies on Quantum Random Number Generation (QRNG) and Authenticated Encryption with Associated Data (AEAD).

To provide a method for logged-in clients to encrypt and decrypt data-at-rest with maximal entropy symmetric keys utilizing Authenticated Encryption with Associated Data (AEAD) and the Moving Target design. The symmetric keys are obtained through the Key Management Service.

Figure 1B:
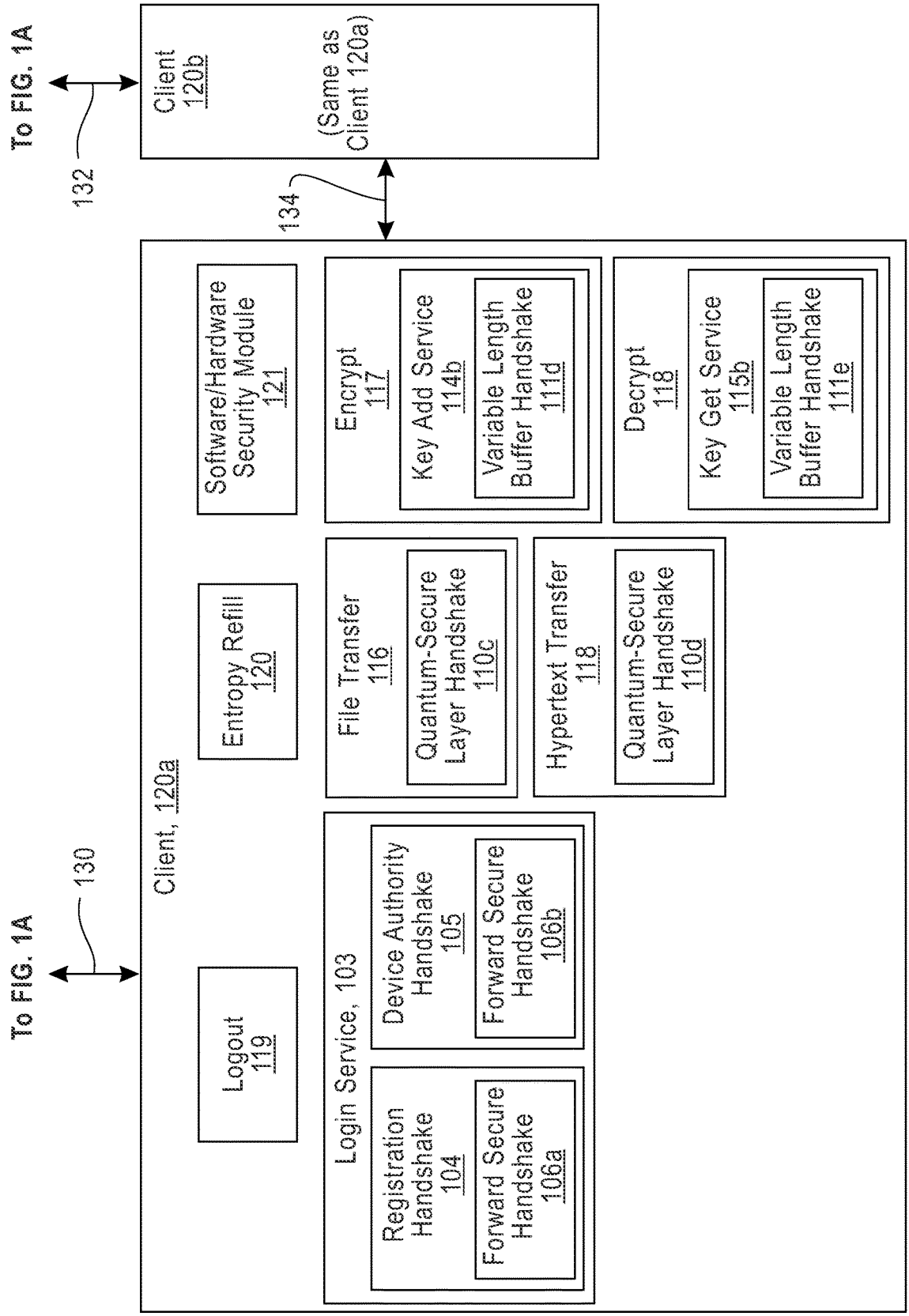
FIG. 1B is a block diagram of an example of the components interacting with the Clients 120a and 120b, without a certificate authority, to provide at least post-quantum communications security over a computer network, in accordance with some implementations of the present invention.

With reference to FIGS. 1A and 1B, shown is a current preferred embodiment of the invention. Within this illustration, the aspects as described within this disclosure show the elimination of unnecessary steps in the negotiation during the security handshake protocol. Customized client/server behavior regarding the elimination of the need for certificate exchange and a trusted Root Certificate Authority (CA) that generates a self-signed public key used to distribute signed public/private keypairs down the certificate chain to sub-CAs. Additionally, to create a zero-trust negotiation during QSL handshake, and to provide a post-quantum secure and backward compatible security protocol.

With reference to FIGS. 1A and 1B a Server 100, a block diagram of an example of a system and components for handshaking, without a certificate authority, to provide at least post-quantum communications security over a computer network. The server 100 includes a server 100, clients 120a and 120b, and a communication networks 130, 132, and 134. The Server 100 illustrated in FIG. 1A is provided as one example of such a system. The methods described herein may be used with systems with fewer, additional, or different components in different configurations than the Server 100 illustrated in FIG. 1A. For example, in some implementations, the Server 100 may include additional servers, may include additional or fewer clients, and/or may include more communication networks. Although illustrated as separate components in FIG. 1A, in some implementations, the Server 100 and one or more clients 120a and 120b may be included in a single electronic device. For example, the Server 100 and the initiator 120a or 120b may be included in a single electronic device. As a further example, the Server 100 and the recipient 120a or 120b may be included in a single electronic device.

Unique Identifier Dataset FIG. 1C 101 illustrates the current preferred embodiment of the database scheme used to identify a unique entity for communication from the Key Management Service 113a. This communication uses this structure to complete the handshake as in Key Add Service 114a or Key Get Service 115a for the purpose of encrypting the necessary data and keys for a single client 120a or 120b.

Key Management Dataset FIG. 1D 102 illustrates the current preferred embodiment of the database scheme used to identify elements within the Key Management Service 113a. The Key Management Dataset 102 FIG. 1D is used to add symmetric keys when requested from other services using Key Add Service 114a, and to use keys that are in the processes with the Key Get Service 115a. Because the Key Management Service 113a relies on the Hardware Security Module logic construct an actual "Handle" is used versus the key for better security retrieval.

Hardware Security Module (HSM) FIG. 1A 108 all KEM and cryptographic operations are controlled though the HSM. This component has all cryptographic algorithms and systems logic to avoid security side channel attacks on key pairs or symmetric keys or not limited to other elements requiring vaulting protection. The Hardware Security Module (HSM) 108 controls but not limited to key creation and extraction from the Quantum Random Number Generator 109 and associated storage.

Quantum Random Number Generator (QRNG) FIG. 1A 109 QRNG delivers random numbers to act as cryptographic keys and other security parameters, deterministic RNG seeding, initialization vectors, nonces, random challenges, authentication and DSA signing. Other applications include Entropy as a Service (EaaS), simulations, modeling and computer gaming. This generator feeds the cryptographic keys directly into the Hardware Security Module for greater entropy security retrieval. Other outside processes are shielded from this generator. Only protocols that reside within the HSM can access the n-dimensional quantum key source that is produced.

Variable Length Buffer Handshake FIG. 1A 111 to create a handshake for transferring a buffer of variable length to be used by all services involving a logged-in client, reliant only on Authenticated Encryption with Associated Data (AEAD). The purpose is to exchange any length buffer without knowledge of what size the buffer is going to be. The length is sent over followed by the buffer, to ensure the recipient has the correct size to read.

Variable Length Buffer Handshake Steps:
1. The initiator sends the length of buffer to the recipient using AEAD;
2. The initiator sends the buffer to the recipient using AEAD.

Login Service FIG. 1A 103a Client authentication, login 103b on the client would communicate with the login service 103a to perform authentication. Other components that are contained within this include but not limited to organization onboarding, administration onboarding, and individual client onboarding. FIG. 1A and FIG. 1B represent 2 clients in an organization that communicate to the Server 100. This also implies multi-tenancy communication from client 120a and 120b to Server 100. An additional component within the Login Service 103a is the Registration Handshake 104a to identify the individual clients to the Server 100. This populates the unique identifier 122 FIG. 1C for the first time within the Server 100. The unique identifier elements and post-quantum token will be passed to the client. Other elements that are captured include items such as, IP address, MAC, routing address.

As part of the registration the client will need to perform the Forward Secrecy Handshake 106a and that includes communication with the key encapsulation system of the Server 100 using but not limited to Saber or Kyber Post Quantum algorithms. These associate a post quantum key pair structure in which the Server 100 retains the secret key portion of the pair structure. The Client 120*a* or receives the public key portion and uses said key to establish a shared secret or symmetric key with Server 100. This process then creates a second post quantum key pair which is communicated using the symmetric key to transmit in a protected manner, thus reducing the probability of interception of the communication and data. This second post-quantum key pair is unique to each session; for data to be compromised the Server 100 secret key and the second secret key must be broken to get access to the data or session. At the conclusion of registration, the client 120*a* or 120*b* receives a unique identifier and a post-quantum token for future authentication.

Device Authority Handshake FIG. 1A 105*b* is used when the Client 120*a* or 120*b* need to log into the system after having previously registered. This is accomplished by using the unique identifier and post-quantum token with the same Forward Secrecy Handshake 106*b* to establish the client's authentication from the Unique Identifier Dataset 101 FIG. 1C. The Server 100 and Device Authority Handshake 105*a* will update the symmetric key of Unique Identifier Dataset 101 FIG. 1C at login for the individual client unique identifiers. In some embodiments, the Registration Handshake and Device Authority Handshake can be configured to generate and share an ephemeral KEM public key with the client at their conclusion. In such an embodiment, the Forward Secrecy Handshake is not needed by the Device Authority Handshake—since the client can initiate the handshake with an ephemeral KEM public key. The resulting Ephemeral KEM Handshake 118*b* used allows for a login with a reduced number of roundtrips.

Logout Service FIG. 1A 112*a* clears the dataset symmetric keys associated with the unique identifier at close of session. Logout 112*b* has access to Unique Identifier Dataset 101 associated FIG. 1C. The Logout Service offloads symmetric encryption/decryption to the HSM. The Logout Service pulls in the symmetric key(s) and routing address associated with relevant unique identifiers from Unique Identifier Dataset. The Logout Service may be activated by a lack of a response from the relevant client.

Authentication of clients and establishing a connection through cryptography. KEM utilization which gives a performance advantage over Digital Signature utilization. Login, authentication, after established FS handshake.

Entropy Refill FIG. 1B 107*b* is used during high volume communications to replenish the clients 120*a* or 120*b* entropy pool to continue the post-quantum secure communication or Data at Rest process. The Entropy Refill Service offloads symmetric encryption/decryption to the HSM. The Entropy Refill Service provides bulk entropy from the QRNG to the client to maintain the Client's entropy pool, the advantage allows offline and high-volume key availability. The Entropy Refill Service pulls in the symmetric key(s) and routing address associated with relevant unique identifiers from Unique Identifier Dataset.

Key Management Service FIG. 1A 113*a* The KMS pulls in the symmetric key(s) and routing address associated with relevant unique identifiers from Unique Identifier Dataset.

Key Add Service FIG. 1A 114*a* and Key Add FIG. 1B 114*b*, 114*b* add symmetric keys encrypted with HSM into the Server 100 database encryption keys system. This data is stored externally but cannot be access without the HSM to decrypt prior to transmittal. The Key Management Dataset FIG. 1D contains the information used in this process.

Key Get Service FIG. 1A 115*a* and Key Get FIG. 1B 115*b* reaches out to HSM to get keys get decrypted key from database.

Encrypt FIG. 1B 113*b* Encrypt (Data-At-Rest) utilizes Key Add 114*b* to reach out to the Key Management Service 113*a*, specifically the Key Add Service 114*a* to get encryption keys. Encrypt encrypts the data using the Moving Target Design to switch between encryption keys. Symmetric encryption (AEAD) is offloaded to the S/HSM.

Decrypt FIG. 1B 113*c* Decrypt (Data-At-Rest) utilizes Key Get 115*b* to reach out to the Key Management Service 113*a*, specifically the Key Get Service 115*a* to get decryption keys. Decrypt decrypts the data using the Moving Target Design to switch between decryption keys. Symmetric decryption (ADAD) is offloaded to the S/HSM. Key Get Service 115*a* reaches out to HSM to get keys get decrypted key from database.

Figure 2:
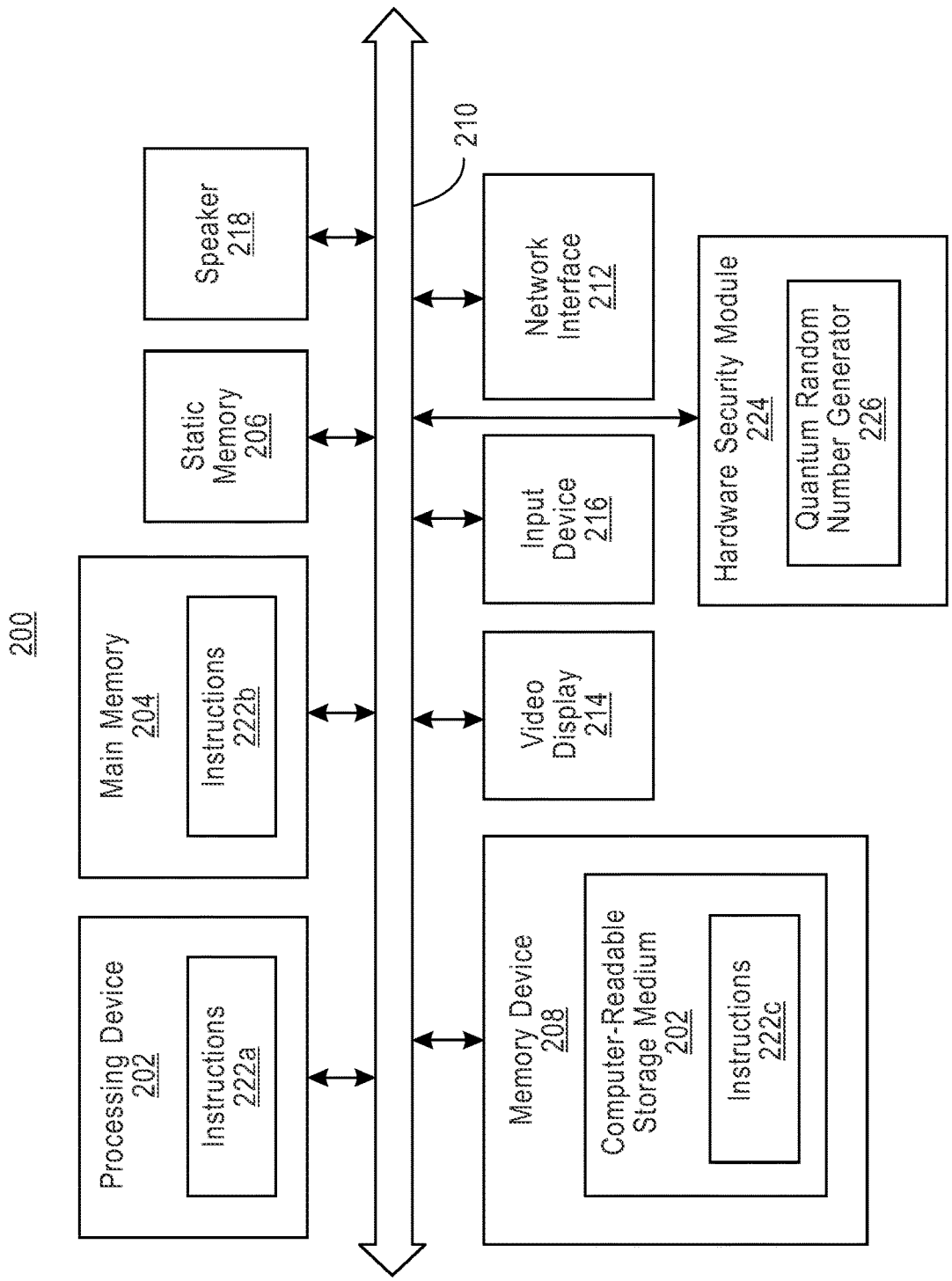
FIG. 2 is a block diagram of an example of a computer system, in accordance with some implementations of the present invention.

FIG. 2 is a block diagram of an example computer system 200 which can perform any one or more of the methods described herein, in accordance with one or more aspects of the present disclosure. In one example, the computer system 200 may include a computing device and correspond to one or more of the servers 100, the client 120*a*, 120*b*, or any suitable component of FIG. 1A. The computer system 200 may be connected (e.g., networked) to other computer systems in a local area network (LAN), an intranet, an extranet, or the Internet, including via the cloud or a peer-to-peer network. The computer system 200 may operate in the capacity of a server in a client-server network environment. The computer system 200 may be a personal computer (PC), a tablet computer, a wearable (e.g., wristband), a set-top box (STB), a personal Digital Assistant (PDA), a mobile phone, a smartphone, a camera, a video camera, an Internet of Things (I) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 200 (one example of a "computing device") illustrated in FIG. 2 includes a processing device 202, a main memory 204 (e.g., read-only memory (ROM), flash memory, solid state drives (SSDs), dynamic random access memory (DRAM) such as synchronous DRAM (SDRAM)), a static memory 206 (e.g., flash memory, solid state drives (SSDs), or static random access memory (SRAM)), and a memory device 208, wherein any of the foregoing may communicate with each other via a bus 210. In some implementations, the computer system 200 may further include a hardware security module (not shown).

The processing device 202 represents one or more general-purpose processing devices such as a microprocessor, central processing unit, or the like. More particularly, the processing device 202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 202 may also be one or more special-purpose processing devices such as an application specific integrated circuit (ASIC), a system on a chip, a field programmable gate array (FPGA), a digital signal processor (DSP), network processor, or the like. The processing device 202 may be configured to execute instructions for performing any of the operations and steps discussed herein.

The computer system 200 illustrated in FIG. 2 further includes a network interface device 212. The computer system 200 also may include a video display 214 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 216 (e.g., a keyboard and/or a mouse or a gaming-like control), and one or more speakers 218 (e.g., a speaker). In one illustrative example, the video display 214 and the one or more input devices 216 may be combined into a single component or device (e.g., an LCD touchscreen).

The memory device 208 may include a computer-readable storage medium 202 on which the instructions 222c embodying any one or more of the methods, operations, or functions described herein are stored. The instructions 222c may also reside, completely or at least partially, within the main memory 204 as instructions 222b and/or within the processing device 202 during execution thereof by the computer system 200. As such, the main memory 204 or as instruction 222a and the processing device 202 also constitute computer-readable media. The instructions 222 may further be transmitted or received over a network via the network interface device 212.

While the computer-readable storage medium 220 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium capable of storing, encoding or carrying out a set of instructions for execution by the machine and that cause the machine to perform any one or more of the methods disclosed herein. The term "computer-readable storage medium" shall accordingly be taken to include, but not be limited to, solid-state memories, optical media, and magnetic media.

While the computer system environment of 200 shows the basic components the addition of a Hardware Security Module 224 associated with a Quantum Random Number Generator 226 are added to complete the entropy required for Post Quantum computations and interactions. The use of these components is critical as described previously in the overall methods used for this system.

The present invention may be a system, a method, and/or a computer program product. The computer program product may include a computer readable storage medium (or media) having computer readable program instructions thereon for causing a processor to carry out aspects of the present invention.

The computer readable storage medium 202 can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions 222c described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions 222c for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions 222c may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 3A:
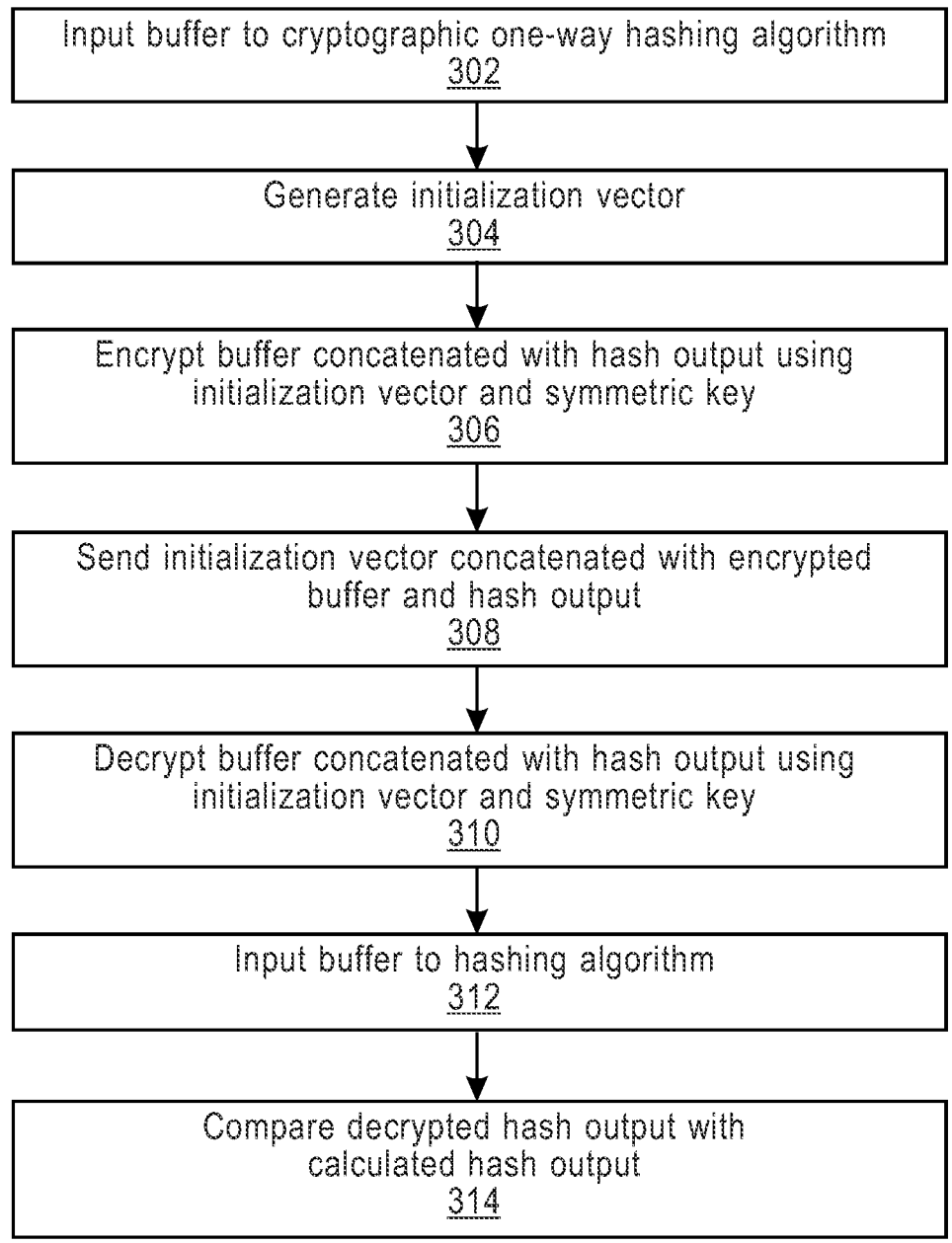
FIG. 3A is a flow diagram of an example method for Authenticated Encryption with Associated Data using the Hash-then-Encrypt method, in accordance with some implementations of the present invention.

FIG. 3A Hash Then Encrypt AEAD 300 A method of Authenticated Encryption with Associated Data following the Hash-then-Encrypt framework. Associated data may be concatenated to the buffer and input to the cryptographic one-way hashing algorithm. The unencrypted associated data can then be concatenated with the encrypted buffer. The initialization vector determines the initial state of the symmetric encryption algorithm. Illustrates the sequence required to establish an Encrypted and Decrypted element. This method is 1 of 2 that will be presented as part of this system's use. At block 302, the input buffer that is in process will be presented to a one-way cryptographic hashing algorithm to create the message authentication code of this data. Block 304 generates the initialization vector that is used within the forward calculations. At Block 306 the elements listed are used, together with the protected symmetric key, to create the encrypted payload. At Block 308 the said payload and associated data are then transmitted to the receiving client. Block 310-312 reverses the process with the same protected symmetric key and initialization vector for decrypting the data. At block 314, the output of a cryptographic one-way hashing algorithm is compared with the received message authentication code to verify the integrity of the data.

Figure 3B:
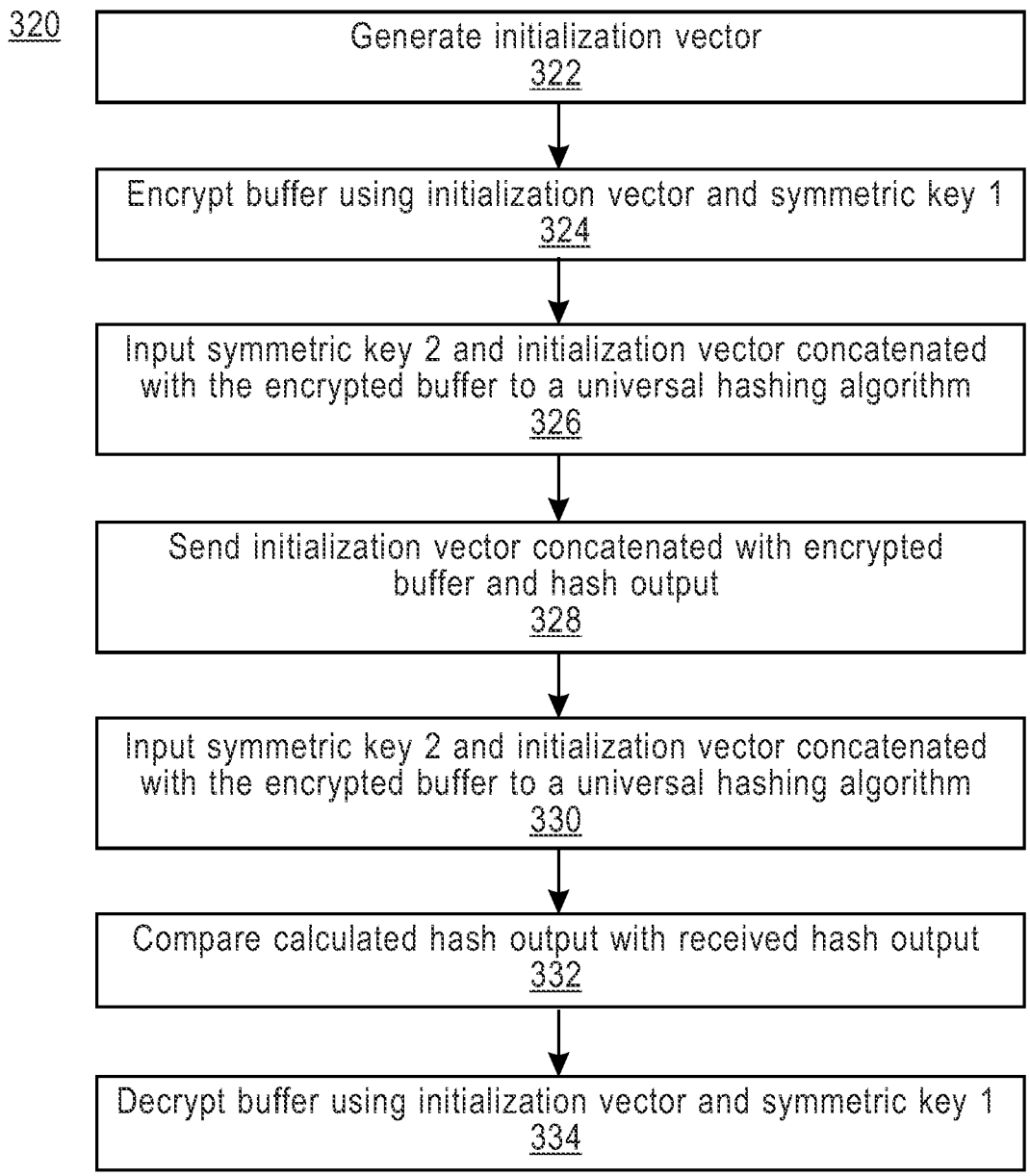
FIG. 3B is a flow diagram of an example method for Authenticated Encryption with Associated Data using the Encrypt-then-Hash method, in accordance with some implementations of the present invention.

FIG. 3B Encrypt Then Hash AEAD 320 A method of Authenticated Encryption with Associated Data following the Encrypt-then-Hash framework. Associated data may be concatenated to the encrypted buffer before it is input to the universal hashing algorithm. The unencrypted associated data can then be concatenated with the encrypted buffer and hash output. The initialization vector determines the initial state of the symmetric encryption algorithm. The sequence for this differs from FIG. 3A by generating the initialization vector 322. In block 324 the payload is encrypted using the protected post quantum symmetric key (key1) and the initialization vector. Block 326 uses the second symmetric key (key 2) to initialize the universal hashing algorithm used to digest the now encrypted data, thus creating a higher level of protection for transmission compared to the Hash-then-Encrypt method. The single symmetric key can be updated by the server generating multiple symmetric keys and the server generating the maximum number of bytes each symmetric key may be used to encrypt; the clients switch to the next symmetric key prior to the current symmetric key encrypting the maximum number of bytes. Blocks 330-334 reverse the sequence to end with the data decrypted and its integrity checked.

Figure 4:
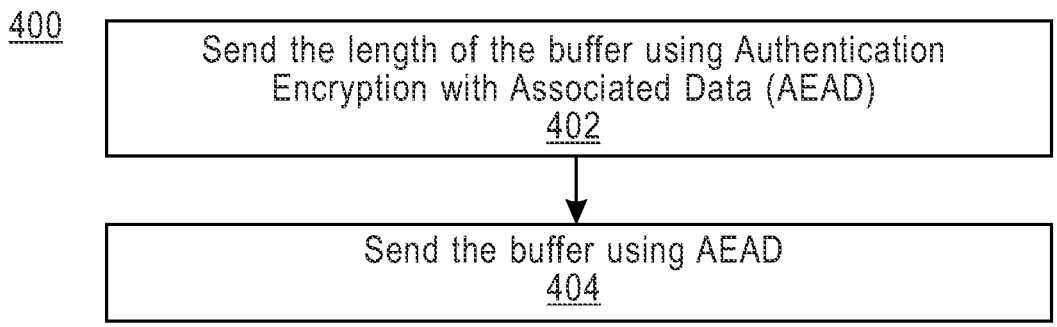
FIG. 4 is a flow diagram of an example method for exchanging variable length buffers using Authenticated Encryption with Associated Data (AEAD), in accordance with some implementations of the present invention.
Figure 8A:
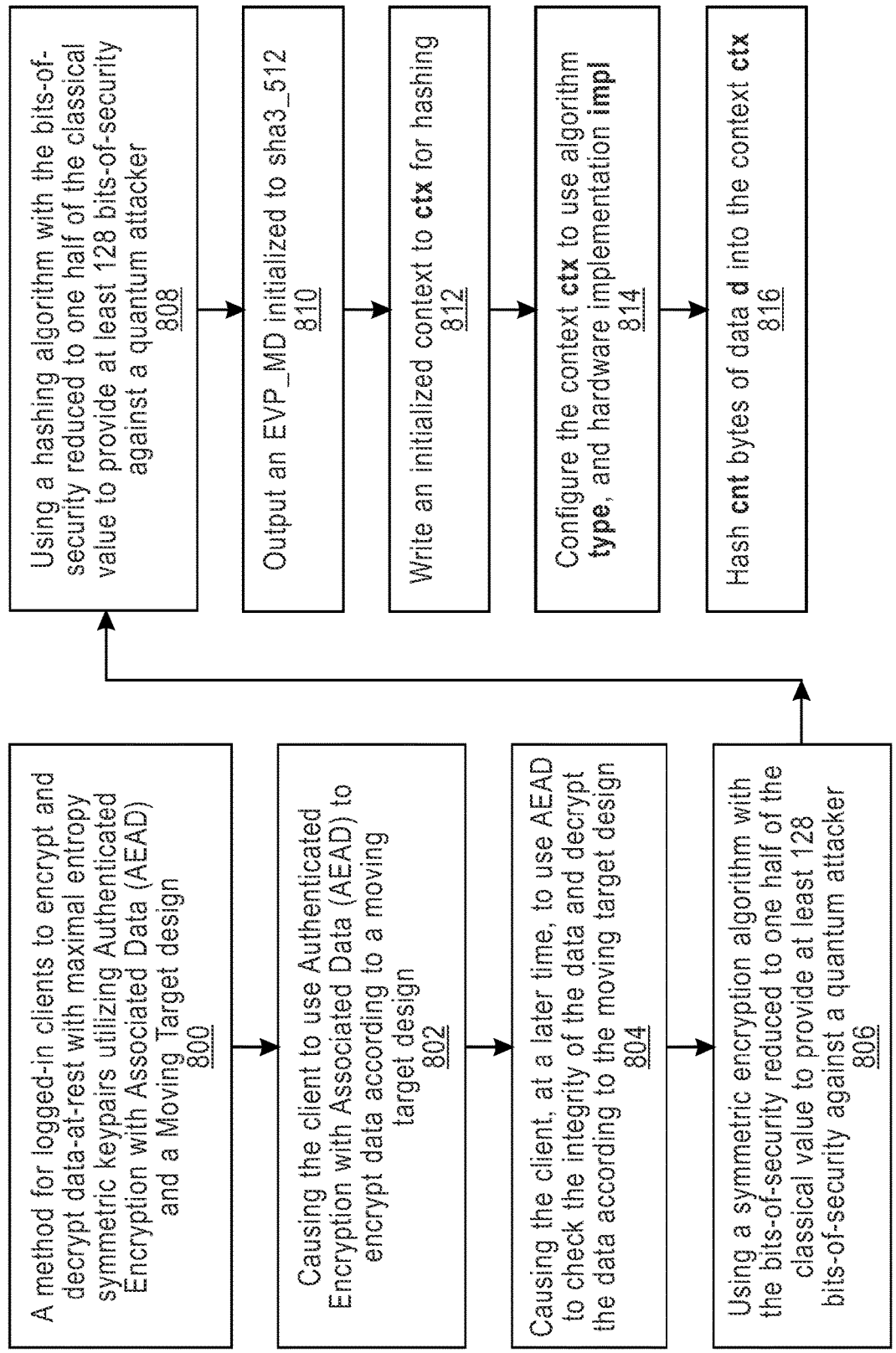
FIG. 8A-8D are flow diagrams of an example method for logged-in clients to encrypt and decrypt data-at-rest, in accordance with some implementations of the present invention.
Figure 8B:
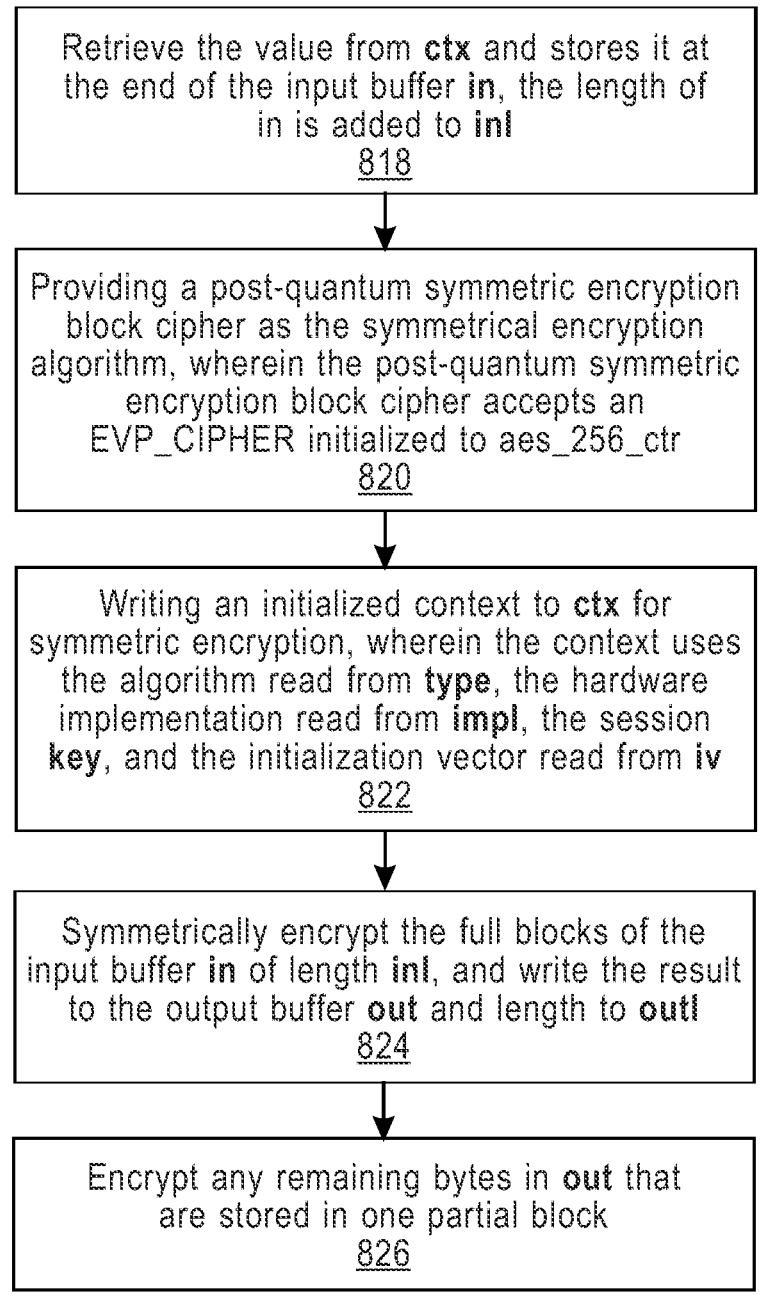
Figure 8C:
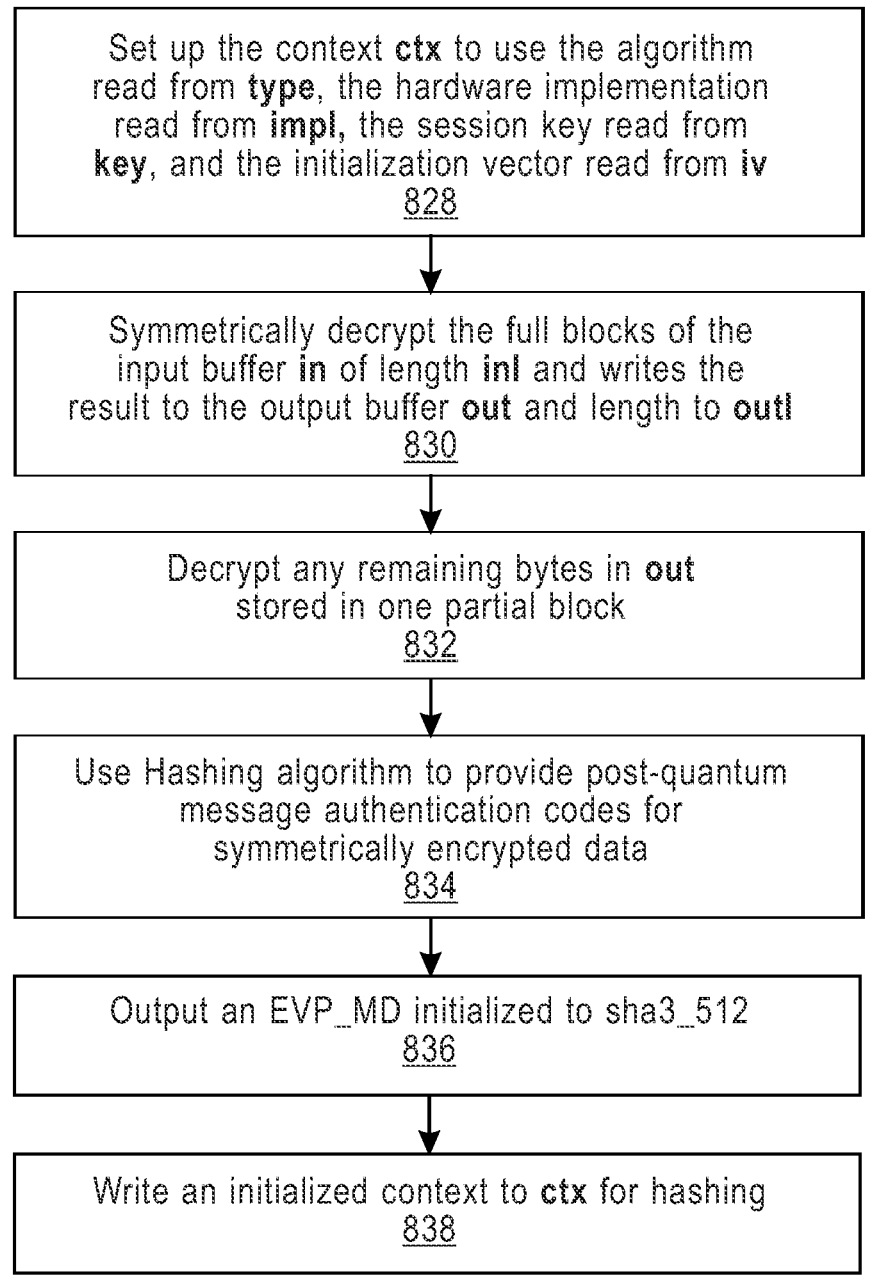
Figure 8D:
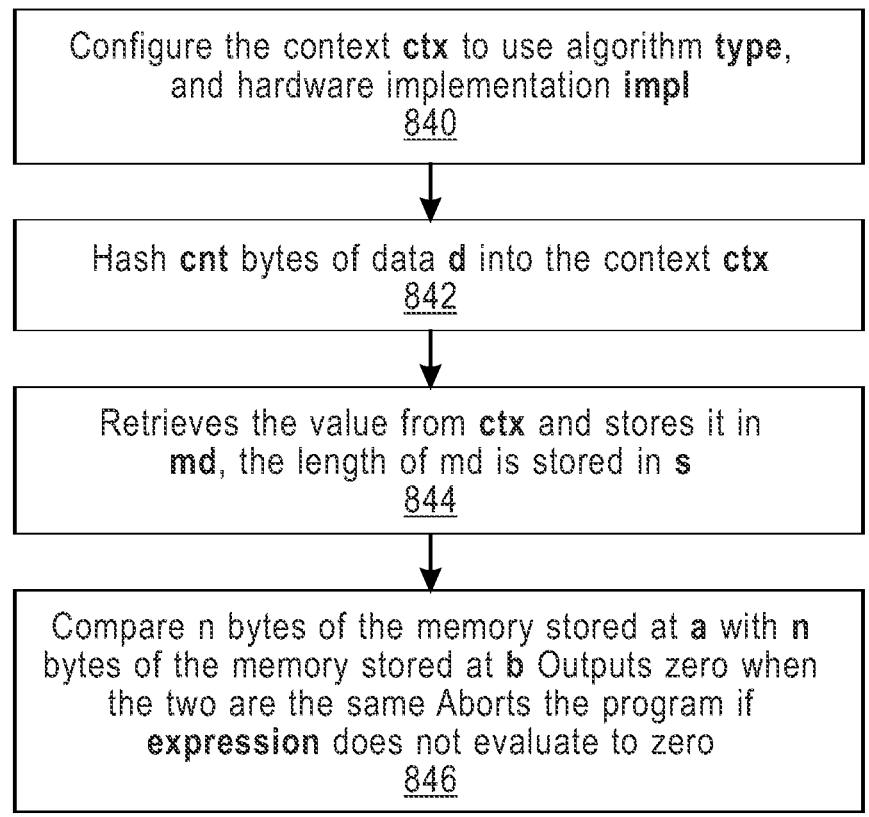

FIG. 4 Variable Length Buffer Handshake 400 The Variable Length Buffer Handshake is used to communicate a buffer of variable length between two parties. AEAD is used to provide confidentiality and integrity of data according to FIG. 3B or 3A. First the length of the buffer is sent by an initiator 402, then the buffer itself is sent by the initiator 404.

FIG. 5 Forward Secrecy Handshake 530 The Forward Secrecy Handshake allows two parties to establish forward secrecy using Key Encapsulation Mechanisms. The first shared secret is exchanged using a static KEM keypair. The shared secret is then used to exchange an ephemeral KEM keypair, which is used to establish a second shared secret. The second shared secret is not vulnerable if the long-term secret, the static KEM key pair, is compromised. Block 532-548 show a sequence of establishing proper secrecy in a way that is novel and highly protective.

FIG. 6 Moving Target 600 The Moving Target Design provides a method for injecting new key material into an existing session, as well as a method to switch between encryption keys. The keys and the number of bytes each key will encrypt is determined by the server and is transferred to the client using the Variable Length Buffer Handshake. This process 600 starts by having the initiator use AEAD to send the number of bytes they plan to encrypt to the server 602. Then the server randomly generates the number of keys to be used, each key, and the number of bytes each key will encrypt 604. The server then uses the variable length buffer handshake to send each key and the number of bytes each key will encrypt to the initiator 606. The process then determines if the initiator runs of keys before all of data is encrypted. If so, then the initiator restarts from the beginning, 608.

Referring to FIG. 7, a system for allowing clients to communicate with a data-at-rest key management server. The client 702 is in contact with a data-at-rest key management server 704. The method for establishing the secure communications will be described hereafter.

Referring to FIGS. 8A-8D, a method for logged-in clients to encrypt and decrypt data-at-rest with maximal entropy symmetric keypairs utilizing Authenticated Encryption with Associated Data (AEAD) and the Moving Target design 800. The method continues by causing the client to use Authenticated Encryption with Associated Data (AEAD) to encrypt data according to a moving target design, where the client is always able to loop back and decrypt any incoming keys 802. Causing the client, at a later time, to use AEAD to check the integrity of the data and decrypt the data according to the moving target design 804. Using a symmetric encryption algorithm with the bits-of-security reduced to one half of the classical value to provide at least 128 bits-of-security against a quantum attacker 806. Using a hashing algorithm with the bits-of-security reduced to one half of the classical value to provide at least 128 bits-of-security against a quantum attacker 808.

Still referring to FIGS. 8A-8D, output an EVP_MD initialized to sha3_512 810 and write an initialized context to ctx for hashing 812. Configure the context ctx to use algorithm type, and hardware implementation impl 814. Hash cnt bytes of data d into the context ctx 816. Retrieve the value from ctx and store it at the end of the input buffer in, with the length added to inl 818. The method continues by providing a post-quantum symmetric encryption block cipher as the symmetrical encryption algorithm, wherein the post-quantum symmetric encryption block cipher outputs an EVP_CIPHER initialized to aes_256_ctr 820. Writing an initialized context to ctx for symmetric encryption, wherein the context ctx uses an algorithm read from type, the hardware implementation read from impl, the session key read from key, and the initialization vector read from iv 822. The method still includes symmetrically encrypting the full blocks of the input buffer in of length inl, and write the result to the output buffer out and length to outl 824. Encrypting any remaining bytes in out that are stored in one partial block 826.

Referring to FIGS. 8A-8D, setting up the context ctx to use the algorithm read from type, the hardware implementation read from impl, the session key read from key, and the initialization vector read from iv 828. Symmetrically decrypt the full blocks of the input buffer in of length inl and writes the result to the output buffer out and length to outl 830. Decrypt any remaining bytes in out stored in one partial block 832. Use hashing algorithm to provide post-quantum message authentication codes for symmetrically encrypted data 834. Output an EVP_MD initialized to sha3_512 836 and write an initialized context to ctx for hashing 838. The method for logged-in clients to encrypt and decrypt data-at-rest concludes by configuring the context ctx to use algorithm type, and hardware implementation impl 840. Hash cnt bytes of data d into the context ctx 842. Retrieve the value from ctx and stores it in md, the length of md is stored in s 844. Compare n bytes of the memory stored at a with n bytes of the memory stored at b; outputs zero when the two are the same or aborts the program if expression does not evaluate to zero 846.

Figure 9A:
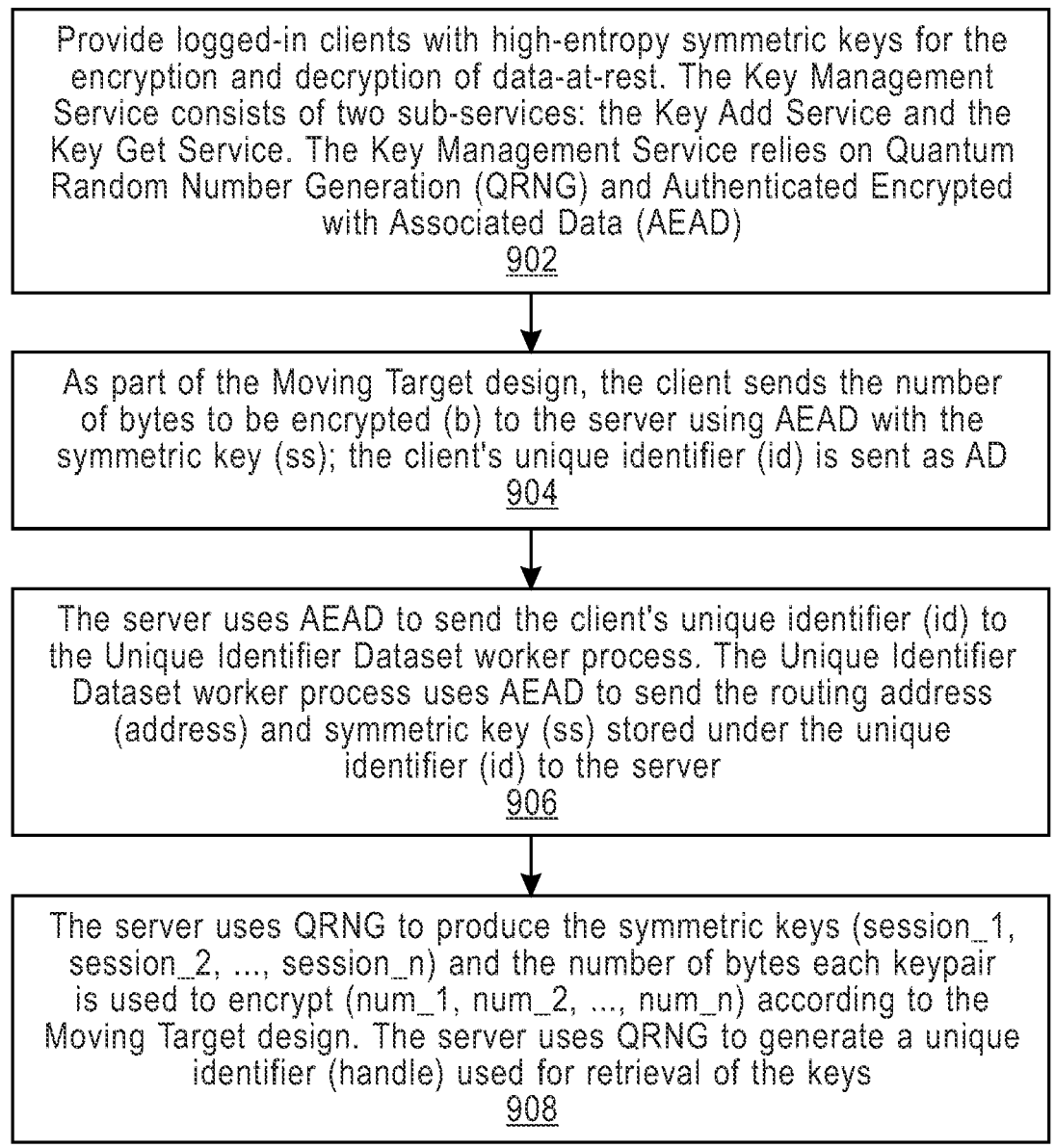
Figure 9C:
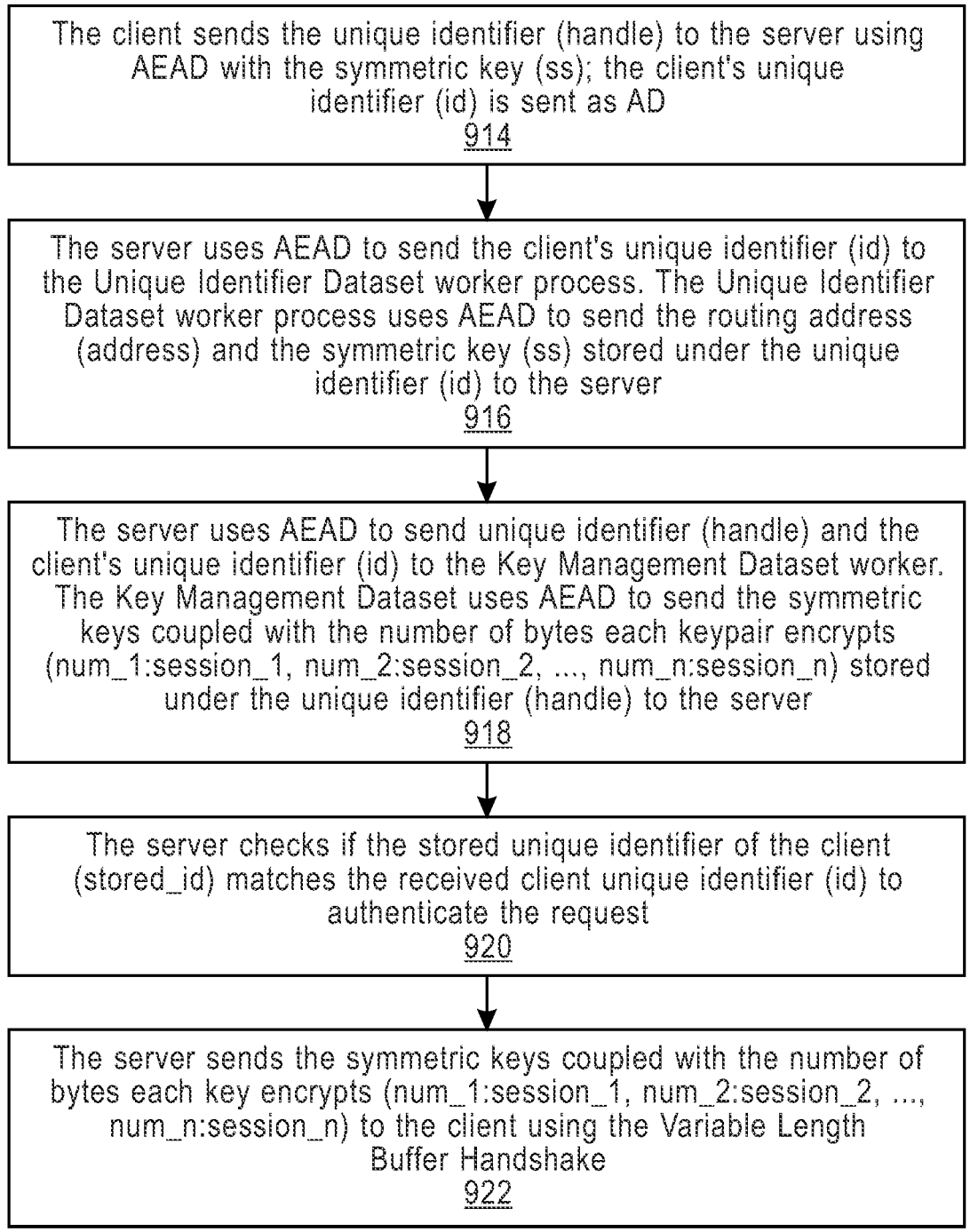

Referring to FIGS. 9A-9C, a method to provide logged-in clients with high-entropy symmetric keypairs for the encryption and decryption of data-at-rest. The Key Management Service consists of two sub-services: the Key Add Service and the Key Get Service. The Key Management Service relies on Quantum Random Number Generation (QRNG) and Authenticated Encryption with Associated Data (AEAD) following the Moving Target design 902. As part of the Moving Target design, the client sends the number of bytes to be encrypted (b) to the server using AEAD with the symmetric key (ss); the client's unique identifier (id) is sent as AD 904. The server uses AEAD to send the client's unique identifier (id) to the Unique Identifier Dataset worker process. The Unique Identifier Dataset worker process uses AEAD to send the routing address (address) and the symmetric key (ss) stored under the unique identifier (id) to the server 906. The server uses QRNG to produce the symmetric keys (session_1, session_2, . . . , session_n) and the number of bytes each key is used to encrypt (num_1, num_2, . . . , num_n) according to the Moving Target design. The server uses QRNG to generate a unique identifier (handle) used for retrieval of the keys 908.

Still referring to FIGS. 9A-9C, the method continues with the server using AEAD to send the unique identifier (handle) and the symmetric keys coupled with the number of bytes each keyr encrypts (num_1: session_1, num_2: session_2, . . . , num_n: session_n) to the Key Management Dataset worker process for storage under the unique identifier (handle) 910. The server sends the unique identifier (handle) and the symmetric keys coupled with the number of bytes each key encrypts (num_1: session_1, num_2: session_2, . . . , num_n: session_n) to the client using a Variable Length Buffer Handshake following the Moving Target design 912.

Still referring to FIGS. 9A-9C, the client sends the unique identifier (handle) to the server using AEAD with the symmetric key (ss); the client's unique identifier (id) is sent as AD 914. The server uses AEAD to send the client's unique identifier (id) to the Unique Identifier Dataset worker process; the Unique Identifier Dataset worker process uses AEAD to send the routing address (address) and the symmetric key (ss) stored under the unique identifier (id) to the server 916. The server uses AEAD to send the unique identifier (handle) to the Key Management Dataset worker; the Key Management Dataset uses AEAD to send the stored unique identifier of the client (stored_id) and the symmetric keys coupled with the number of bytes each key encrypts (num_1: session_1, num_2: session_2, . . . , num_n: session_n) stored under the unique identifier (handle) to the server 918. The server checks if the stored unique identifier (stored_id) matches the received client unique identifier (id) to authenticate the request 920. The server sends the symmetric keys coupled with the number of bytes each keypair encrypts (num_1: session_1, num_2: session_2, . . . , num_n: session_n) to the client using the Variable Length Buffer Handshake 922.

Figure 10:
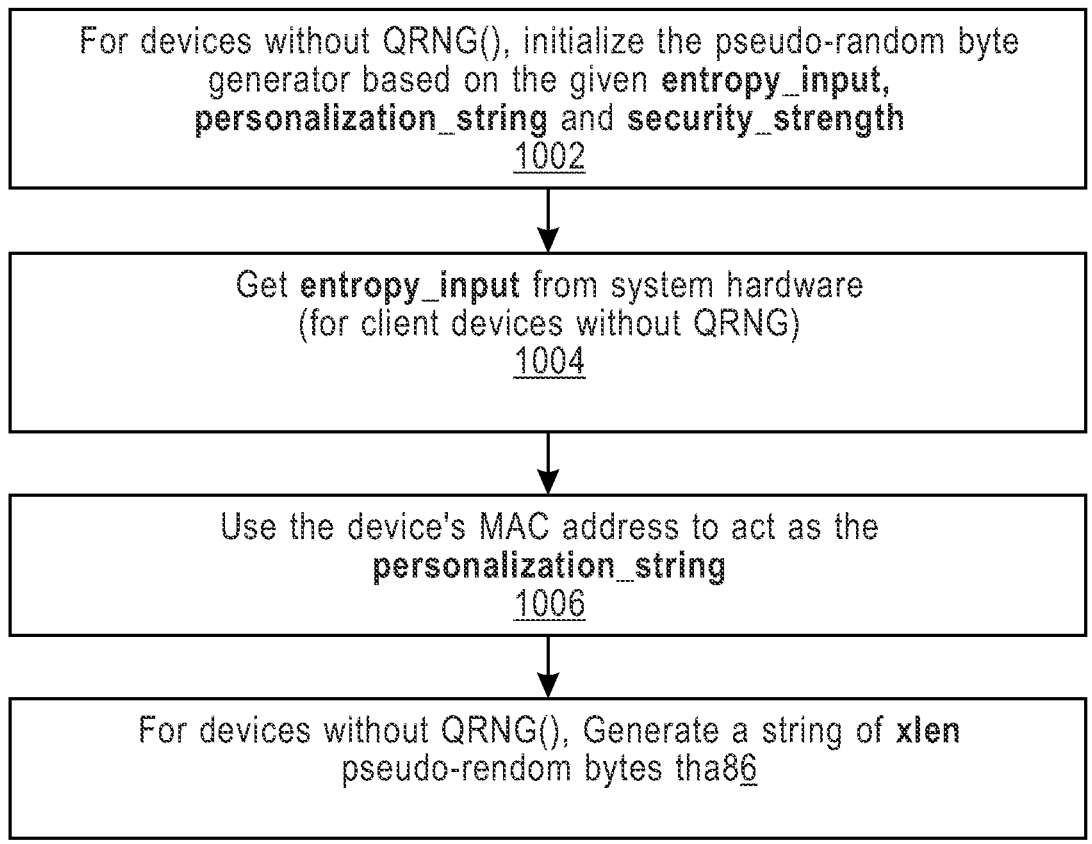
FIG. 10 is a flow diagram of an example method for key management for devices without QRNG, in accordance with some implementations of the present invention.

Referring to FIG. 10, another method according another embodiment of present invention for devices without QRNG( ) initialize a pseudo-random byte generator based on the given entropy_input, personalization_string and security_strength 1002. Get entropy_input from system hardware (for client devices without QRNG) 1004. Use the device's MAC address to act as the personalization_string 1006. Generate a string of xlen pseudo-random bytes that is written to x 1008.

Figure 11:
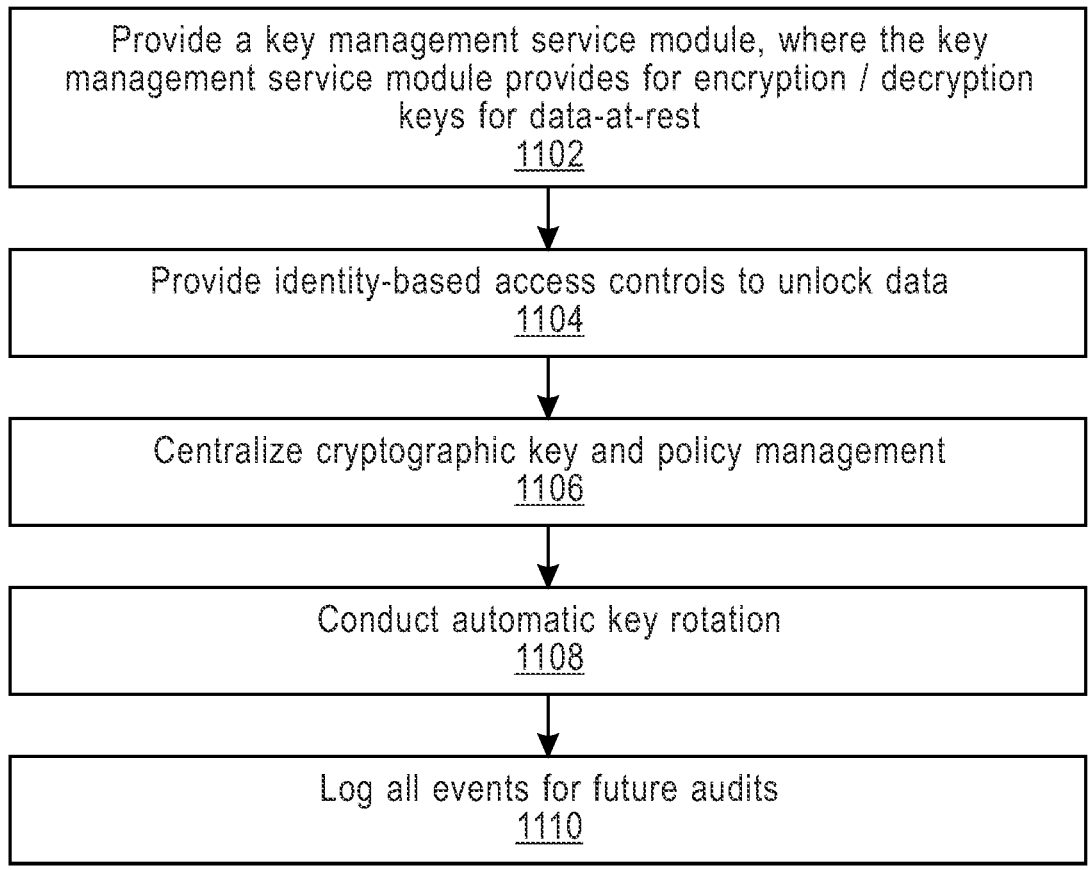
FIG. 11 is a flow diagrams of an example method for key management service module, in accordance with some implementations of the present invention.

Referring to FIG. 11, a method according to still another embodiment of the present invention is to provide a key management service module, where the key management service module provides for encryption/decryption keys for data-at-rest 1102. Provide identity-based access controls to unlock data 1104. Centralize cryptographic key and policy management 1106. Conduct automatic key rotation 1108. Log all events for future audits 1110.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method to allow a client to communicate with a server, specifically to conduct a key management service, in order to obtain encryption/decryption keys for data-at-rest, wherein the method comprises: causing the client to use Authenticated Encryption with Associated Data (AEAD) to encrypt data according to a moving target design; and
   causing the client, at a later time, to use AEAD to check the integrity of the data and decrypt the data according to the moving target design, wherein the method further comprising: using a symmetric encryption algorithm with the bits-of-security reduced to one half of the classical value to provide at least 128 bits-of-security against a quantum attacker.

2. The method according to claim 1, wherein the method further comprising: using a hashing algorithm with the bits-of-security reduced to one half of the classical value to provide at least 128 bits-of-security against a quantum attacker.

3. The method according to claim 1, wherein the symmetrical encryption algorithm is a post-quantum symmetric encryption block cipher.

4. The method according to claim 3, wherein the post-quantum symmetric encryption block cipher outputs an EVP CIPHER initialized to aes_256_ctr.

5. The method according to claim 3, wherein the post-quantum symmetric encryption block cipher outputs an EVP CIPHER initialized to aes_256_gcm.

6. A system comprising:
   at least one processor, at least one computer-readable memory, and at least one computer-readable, tangible storage device wherein:
   the at least one processor communicates with at least one outside processor to allow a client to communicate with a server, specifically to conduct a key management service, in order to obtain encryption/decryption keys for data-at-rest, wherein the system comprises:
   a client computing device is configured to:
   cause the client to use Authenticated Encryption with Associated Data (AEAD) to encrypt data according to a moving target design; and
   cause the client, at a later time, to use AEAD to check the integrity of the data and decrypt the data according to the moving target design, wherein the client computing device is configured to:
   use a symmetric encryption algorithm with the bits-of-security reduced to one half of the classical value to provide at least 128 bits-of-security against a quantum attacker.

7. The system according to claim 6, wherein the client computing device is configured to: use a hashing algorithm with the bits-of-security reduced to one half of the classical value to provide at least 128 bits-of-security against a quantum attacker.

8. The system according to claim 6, wherein the symmetrical encryption algorithm is a post-quantum symmetric encryption block cipher.

9. The system according to claim 8, wherein the post-quantum symmetric encryption block cipher outputs an EVP CIPHER initialized to aes_256_ctr.

10. The system according to claim 8, wherein the post-quantum symmetric encryption block cipher outputs an EVP CIPHER initialized to aes_256_gcm.

* * * * *